(No Model.)
E. L. CLEVELAND.
CAR TRUCK.
No. 259,498. Patented June 13, 1882.
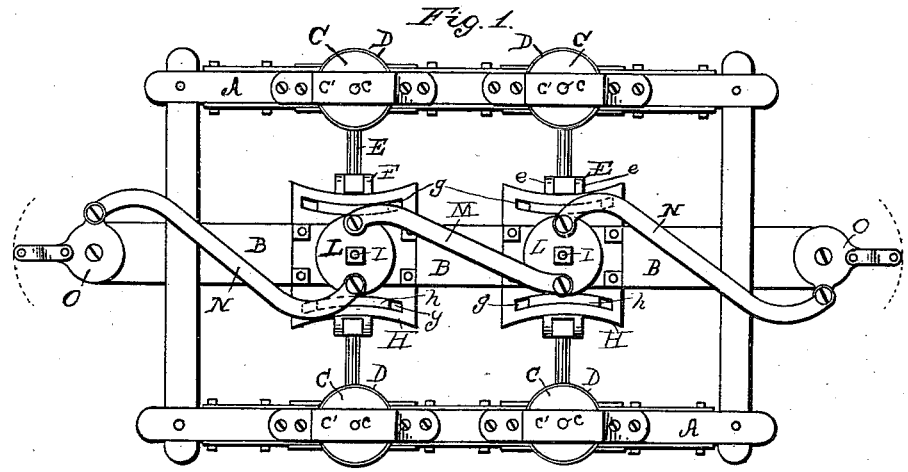
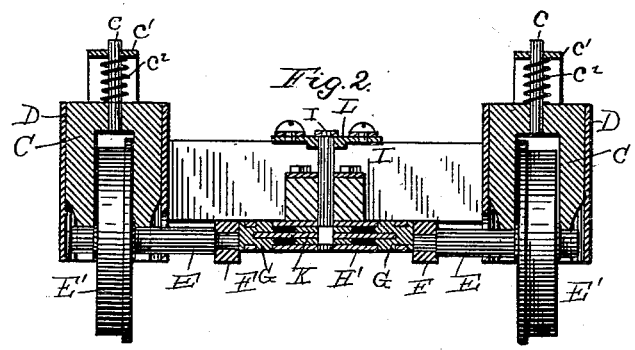
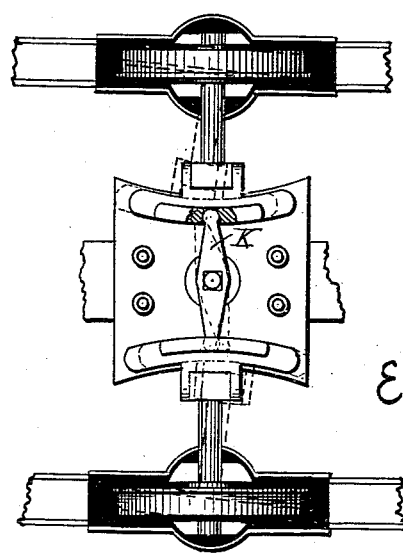
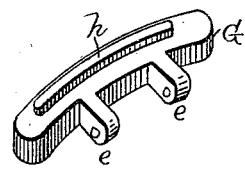
Witnesses:
J. B. Garner
W. A. Craig
Inventor:
E. L. Cleveland
By H. J. Ennis
Atty.

UNITED STATES PATENT OFFICE.

ERASTUS L. CLEVELAND, OF PITTSBURG, PENNSYLVANIA, ASSIGNOR OF ONE-HALF TO ALLEN CUNNINGHAM MILLIKEN, OF SAME PLACE.

CAR-TRUCK.

SPECIFICATION forming part of Letters Patent No. 259,498, dated June 13, 1882.

Application filed April 6, 1882. (No model.)

*To all whom it may concern:*

Be it known that I, ERASTUS L. CLEVELAND, a citizen of the United States, residing at Pittsburg, in the county of Allegheny and State of Pennsylvania, have invented certain new and useful Improvements in Car-Trucks, of which the following is a specification, reference being had therein to the accompanying drawings.

This invention has relation to car-trucks, and the object is to so construct the truck that it will automatically adjust itself to the various curves and irregularities of the track, and thus lessen the strain on the motive power or horses drawing the car, and at the same time greatly reduce the wear and tear of the rolling stock as well as the track and rails; and to that end the novelty consists in the construction of the same, as will be hereinafter more fully described, and particularly pointed out in the claims.

Figure 1 is a top plan view of my improved car-truck. Fig. 2 is a sectional view of the frame through the line of the axle. Fig. 3 is a bottom plan view of the axles, and Fig. 4 is a detached view of the segmental guides.

A A is the frame of the truck, through the center of which runs the continuous draw-bar B.

C C are the axle-bearings, and are cylindrical in form so as to oscillate in the circular casings D. These bearings C are provided with a guide-pin, $c$, extending upward and passing through the strap $c'$, and between the strap and bearing is placed a rubber or metal spring, $c^2$.

The axle E is rigidly secured to the wheel E', and the wheel and axle are so journaled in the bearing C as to turn the whole freely in a line from the point of contact of the wheel and rail to the guide-pin $c$.

The inner end of the axle E is journaled in a block, F, which has a free vertical movement between the lugs $e\ e$ of the segmental guide G. The guides G have an oscillating motion in the slots $g\ g$ in plates H H', the feather or key $h$ corresponding to the curve of the slot $g$ in plates H H'.

A central vertical shaft, I, is mounted in the draw-bar B, and its lower end is secured to the lever K, while its upper end terminates in a circular plate, L. The opposite ends of the lever K are recessed into the inner sides of the guides G, so that a motion in one direction of one of the pair of guides will conform to a reverse motion in the other, and vice versa.

The shaft I, which is connected to one pair of wheels through the medium of the lever K, is also connected to the adjoining wheels and their axles by the connecting-rod M, which is secured to the plates L on opposite sides of the shafts I. Similar connecting-rods, N N, also connect the shafts I to the coupling O, and by reference to Fig. 1 it will be seen that when the strain on the coupling is in the line of the draw-bar B the wheels and their axles are in position for traveling in a straight line; but if the strain is changed to the right or left, so as to correspondingly change the coupler to the right or left, as is the case in turning a corner or traveling around a curve, the changed position of the coupler is communicated to the shafts I by the connecting-rods N, and the lever K swings the guides G to the right and left, and they in turn cause the axles and wheels to assume a position corresponding to the curve upon which the car is traveling.

It will readily be understood that the device is equally operative if the horses are attached to either end of the car, and mounting the wheels in the cylindrical bearings C of itself allows the wheels to readily change their position and almost automatically adapt themselves to the curve.

Having thus fully described my invention, what I claim as new and useful, and desire to secure by Letters Patent of the United States, is—

1. In a car-truck, the wheels E', axles E, and cylindrical bearings C, in combination with the segmental guides G, lever K, shafts I, and connecting-rod M, substantially as set forth.

2. In a car-truck, the wheels and axles E' E, mounted in the cylindrical bearings C, in combination with the segmental guides G, levers K, shafts I, connecting-rods M N, and the coupler O, as and for the purpose set forth.

In testimony whereof I affix my signature in presence of two witnesses.

ERASTUS L. CLEVELAND.

Witnesses:
E. H. BRADFORD,
H. J. ENNIS.